United States Patent
Subramanian

(10) Patent No.: US 12,172,528 B2
(45) Date of Patent: Dec. 24, 2024

(54) METHOD FOR CONTROLLING BRAKING AND/OR TRACTION OF A VEHICLE

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 165 days.

(21) Appl. No.: 17/814,108

(22) Filed: Jul. 21, 2022

(65) Prior Publication Data

US 2023/0026988 A1 Jan. 26, 2023

(30) Foreign Application Priority Data

Jul. 22, 2021 (EP) .................................... 21187255

(51) Int. Cl.
*B60L 3/10* (2006.01)

(52) U.S. Cl.
CPC ........... *B60L 3/108* (2013.01); *B60L 2200/28* (2013.01); *B60L 2240/465* (2013.01)

(58) Field of Classification Search
CPC ................ B60L 3/108; B60L 2200/28; B60L 2240/465; B60T 2230/02; B60T 2230/06; B60T 2240/03; B60T 8/1708; B60T 8/1755; B60T 8/17616
USPC .......................................................... 701/71
See application file for complete search history.

(56) References Cited

U.S. PATENT DOCUMENTS

| 8,577,531 | B2 | 11/2013 | Semsey et al. |
| 9,475,395 | B2 | 10/2016 | Beever et al. |
| 9,963,132 | B2 | 5/2018 | Singh |
| 2005/0161901 | A1 | 7/2005 | Ahner et al. |
| 2022/0126704 | A1* | 4/2022 | Flaum ..................... B60L 15/20 |

FOREIGN PATENT DOCUMENTS

| DE | 19964164 A1 | 7/2001 |
| DE | 102019135087 A1 | 6/2021 |
| EP | 605559 B1 | 2/1996 |
| EP | 1026490 A2 | 8/2000 |
| WO | 9707023 A1 | 2/1997 |

(Continued)

OTHER PUBLICATIONS

European Search Report in corresponding European Application No. 21187255.1 dated Jan. 3, 2022 (3 pages).

*Primary Examiner* — Lindsay M Low
*Assistant Examiner* — Omar Morales
(74) *Attorney, Agent, or Firm* — Venable LLP; Jeffri A. Kaminski

(57) ABSTRACT

A method for controlling braking and/or traction of a vehicle is provided. The methods includes determining by the vehicle control unit a desired slip value based on vehicle state parameters, the desired slip value being communicated to the braking control unit and to the traction control unit, measuring or estimating a slip measure or estimation from wheel parameters collected on the at least wheel tire by the sensor, the slip measure or estimation being communicated to the braking control unit and/or to the traction control unit controlling a wheel slip by the braking control unit and by the traction control unit, based on the desired slip value and the slip measure or estimation.

5 Claims, 2 Drawing Sheets

(56) References Cited

FOREIGN PATENT DOCUMENTS

| | | |
|---|---|---|
| WO | 02053426 A1 | 7/2002 |
| WO | 2004101336 A1 | 11/2004 |
| WO | 2008088304 A2 | 7/2008 |
| WO | 2020187406 A1 | 9/2020 |

* cited by examiner

METHOD FOR CONTROLLING BRAKING AND/OR TRACTION OF A VEHICLE

TECHNICAL FIELD OF THE INVENTION

This invention relates to the field of braking and/or traction control on vehicles.

BACKGROUND

At present, slip control algorithms have indirect closed loop which do not directly control the slip.

There is a request for further optimizing slip to make use of the maximum potential of the tires in braking or traction control on a vehicle.

In articulated vehicles, advanced slip control is needed to control the complete vehicle by optimizing the slip on each axle, including the trailer, to decelerate at the maximum possible rate and at the same time maintain stability in the vehicle.

SUMMARY OF THE INVENTION

To that end, the present invention provides a method for controlling braking and/or traction of a vehicle, the vehicle comprising wheel tires, at least one wheel tire of the vehicle being provided with a sensor configured to collect wheel parameters on the at least one wheel tire, to measure or to estimate a slip measure or estimation from the wheel parameters directly collected on the at least wheel tire, the vehicle further comprising a vehicle control unit and a braking control unit and a traction control unit, the method comprising the following steps:

Determining by the vehicle control unit a desired slip value based on vehicle state parameters, the desired slip value being communicated to the braking control unit and to the traction control unit;

Measuring or estimating a slip measure or estimation from wheel parameters collected on the at least wheel tire by the sensor, the slip measure or estimation being communicated to the braking control unit and/or to the traction control unit;

Controlling a wheel slip by the braking control unit and by the traction control unit, based on the desired slip value and the slip measure or estimation.

According to these provisions, the vehicle has real-time direct and accurate control of the wheel slip ratio and angle, and is thus configured to use the peak longitudinal and lateral forces from the tires.

According to an embodiment, the invention comprises one or more of the following features, alone or in any combination technically compatible.

According to an embodiment, the desired slip value comprises a desired slip ratio value and a desired slip angle value, and the slip measure or estimation comprises a slip ratio and slip angle.

According to an embodiment, the vehicle is an electric vehicle, the electric vehicle further comprising a motor control unit, configured to measure or to estimate a wheel speed measure or estimation, the method further comprising the following step:

Measuring or estimating a wheel speed measure or estimation by the motor control unit, based on a motor speed sensor;

and wherein the wheel slip is controlled in the step of controlling by the braking control unit and/or by the traction control unit, based on a wheel end motor, and on the desired slip value and on the slip measure or estimation and on the wheel speed measure or estimation.

According to an embodiment, the vehicle comprises a tractor and a trailer, the method being applied on the trailer, wherein a trailer wheel slip is controlled in the step of controlling by a braking control unit of the trailer.

According to an embodiment, the vehicle comprises a tractor and a trailer, the method being applied on the tractor, wherein a tractor wheel slip is controlled in the step of controlling by a tractor braking control unit.

According to an embodiment, the method is applied on the tractor and on the trailer, wherein the tractor wheel slip and the trailer wheel slip are controlled in the step of controlling respectively by the tractor braking control unit and by the trailer braking control unit.

According to an embodiment, the vehicle comprises a tractor and a trailer, the method being applied on the tractor, wherein the tractor wheel slip is controlled in the step of controlling by a tractor traction control unit.

According to an embodiment, the method is applied on the tractor and on the trailer, wherein the tractor wheel slip and the trailer wheel slip are controlled in the step of controlling respectively by the tractor traction control unit and by the trailer braking control unit.

According to an embodiment, the vehicle comprises a tractor and a trailer, the method being applied on the tractor, wherein a tractor wheel slip is controlled in the step of controlling by the tractor traction control unit and by the tractor braking control unit.

According to an embodiment, the method is applied on the tractor and on the trailer, wherein the tractor wheel slip is controlled in the step of controlling by the tractor traction control unit and the tractor braking control unit and the trailer wheel slip is controlled in the step of controlling by the trailer braking control unit.

According to an embodiment, the vehicle comprises a trailer comprising trailer wheels, at least one trailer wheel tire being provided with a sensor configured to collect trailer wheel parameters on the at least one trailer wheel tire, to measure or to estimate a trailer wheel slip measure or estimation, and a tractor comprising tractor wheels, at least one tractor wheel tire being provided with another sensor configured to collect tractor wheel parameters on the at one least tractor wheel tire, to measure or to estimate a tractor wheel slip measure or estimation, and wherein the braking control unit comprises a trailer braking control unit and a tractor braking control unit, and wherein the vehicle state parameters comprises trailer vehicle state parameters and tractor vehicle state parameters, and wherein the desired slip value comprises a trailer desired slip value and a tractor desired slip value, and wherein the slip measure or estimation comprises the trailer wheel slip measure or estimation and the tractor wheel slip measure or estimation, and wherein the wheel slip comprises a trailer wheel slip and a tractor wheel slip, the trailer wheel slip being controlled by the trailer braking control unit, based on the trailer desired slip value and the trailer slip measure or estimation, and the tractor wheel slip being controlled by the tractor braking control unit and by the traction control unit, based on the tractor desired slip value and the tractor slip measure or estimation.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which the same reference refer to similar elements or to elements having similar functions, and in which.

DETAILED DESCRIPTION OF THE INVENTION ACCORDING TO AN EMBODIMENT

The invention first involves the intelligent tires 1 of a vehicle, each intelligent tire 1 providing the slip information, or slip measure or estimation SME, on this specific wheel end. An intelligent tire is a wheel tire provided with a sensor 2, configured to collect different wheel parameters WP on the wheel tire, such as a slip measure or estimation SME.

Figure 4:
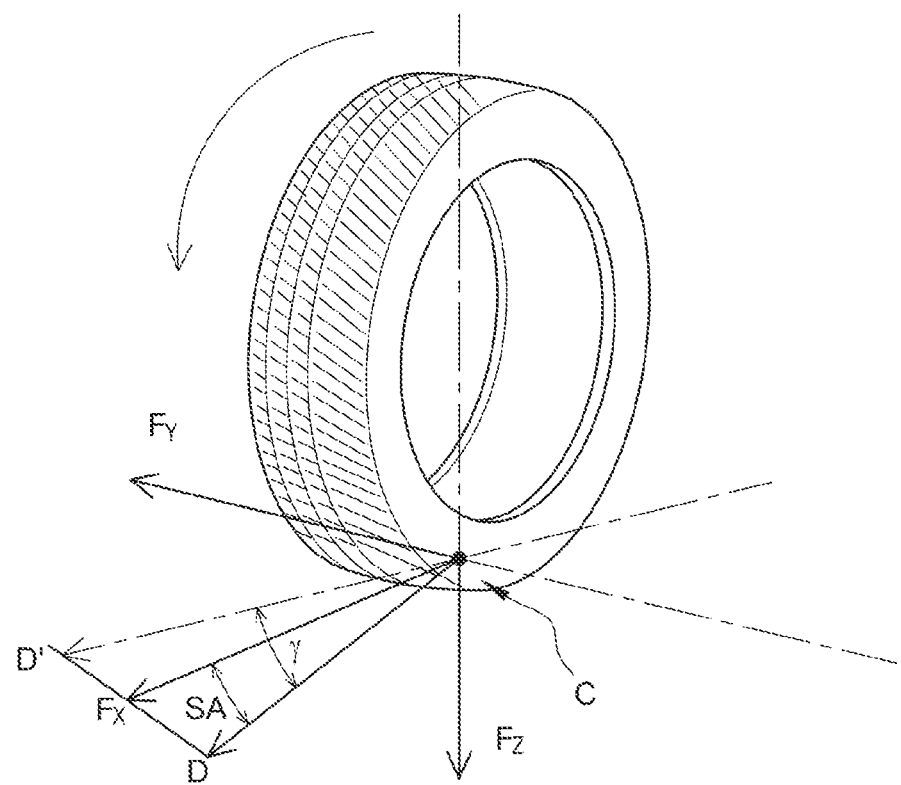
FIG. 4 is a representation of different wheel parameters which may be collected by a sensor on a tire.

In reference to FIG. 4, the wheel parameters WP may be at least one of a load Fz, a rolling radius, a longitudinal force Fx, a longitudinal slip ratio SR, a lateral force Fy, a slip angle SA, a slip ratio, a tire wear; these wheel parameters WP are sensed by the sensor 2 at a point of contact C of the tire with the road, moving in a direction Fx, while the tire is moving in a wheel's pointing direction D, and the vehicle is moving in a direction D' making a steering angle γ with the tire moving direction D.

Longitudinal force Fx is generated by the tire for traction and braking. Lateral force Fy is generated by the tire due to slip angle SA between wheel heading and wheel's pointing direction.

The slip ratio SR is defined by the following formula:

$$\frac{\text{Vehicle Velocity} - \text{Wheel Velocity}}{\text{Vehicle Velocity}} * 100 \qquad [\text{Math 1}]$$

This formula applies to braking and the slip ratio for traction is:

$$\frac{\text{Wheel Velocity} - \text{Vehicle Velocity}}{\text{Wheel Velocity}} * 100 \qquad [\text{Math 2}]$$

For example, slip ratio is 0% when the wheel is rolling free, and 100% when the wheel is locked, through braking, or when the wheel is slipping completely, the vehicle is being tracted.

To improve stopping distance, slip ratio should be controlled to utilize maximum longitudinal force. At the same time, for stability and vehicle to maneuver or prevent jack knifing, the vehicle should generate sufficient lateral force to steer the vehicle in stable condition. Therefore, having direct estimation from the tire sensors 2 to develop a control algorithm to control stability and prevent jack knifing, along with performance related control like stopping distance is beneficial for articulated vehicles, with tractor tires 1 and trailer tires 1 being sensed and controlled independently.

This will require controlling the slip ratio SR and the slip angle SA accurately, with direct feedback from tractor and trailer tire sensors 2 providing wheel parameters WP to measure or estimate a slip measure or estimation SME, comprising slip ratio SR and the slip angle SA. For example, if the wheel parameters comprises slip angle and slip ratio collected directly by the sensor 2 on the tire, then the slip measure or estimation SME is the result of a direct measurement by the sensor 2 on the tire. If the sensor 2 does not provide slip angle and slip ratio directly, the forces and radius may be used to estimate a torque, and to estimate, from the torque estimation, a deceleration and a speed of the wheel which will be further used to estimate slip ratio from the formula Math 1 or Math 2; the man skilled in the art will understand that any other method for slip estimation or prediction may also be used, starting from at least one of the wheel parameters directly provided by the sensor 2. In any case, directly measuring the slip measure SME or estimating slip estimation SME from directly measured wheel parameters WP will benefit to the accuracy of wheel slip WS controlling, by the braking control unit BCU and/or by the traction control unit TCU, based on the slip measure or estimation SME. On top of that, the vehicle comprises a vehicle control unit VCU, implementing a vehicle dynamics model based on vehicle state parameters VSP, the vehicle control unit VCU being configured to control the braking control unit BCU and the traction control unit TCU.

Figure 1:
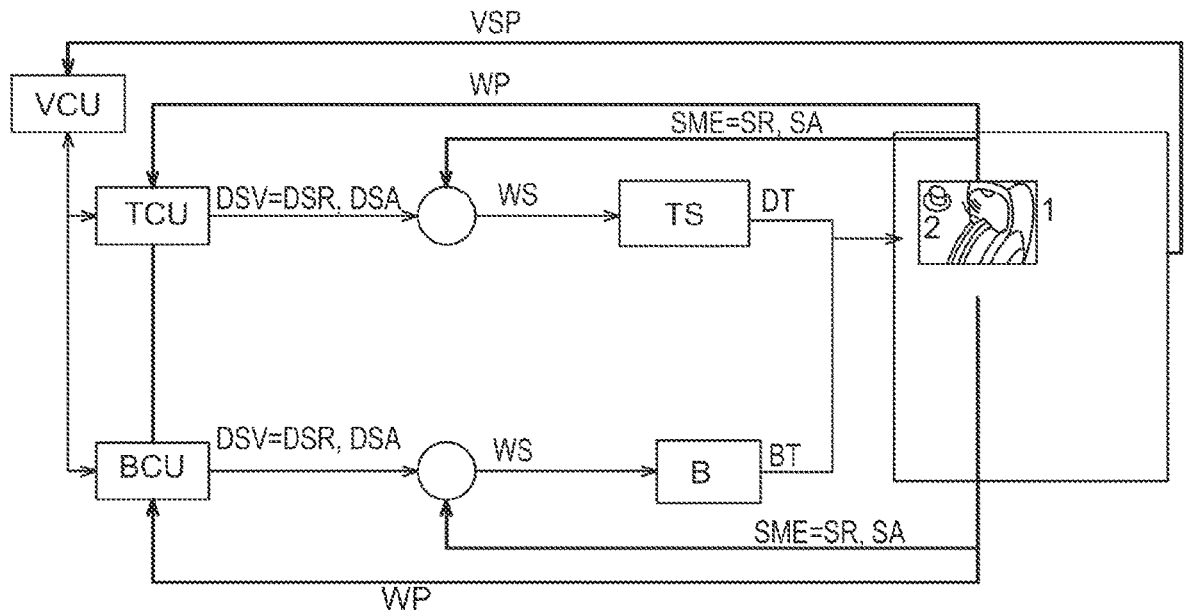
FIG. 1 is a schematic representation of a wheel slip controlling loop according to an embodiment of the invention for conventional vehicles.

The brake and/or traction control method 100 for conventional vehicles, according to an embodiment of the invention illustrated in FIG. 1, consists in collecting 102 the slip measure or estimation SME being measured or estimated directly from wheel parameters WP collected directly on the wheel tires 1 by the sensor 2 placed on the tires 1; the slip measures or estimations SME are provided as a feedback into the braking control unit BCU and/or into the traction control unit TCU to control 103 the wheel slip WS based on the slip measure or estimation SME, and on a desired slip value DSV determined 101 by a vehicle control unit VCU; the determination 101 of the desired slip value DSV is based on vehicle state parameters VSP, and on a vehicle dynamics model involving vehicle dynamics, tire dynamics, and environmental dynamics such as road surface. One of the novel part is to control the wheel slip WS in each wheel end to ensure the vehicle is stable, and there no jack knifing in a tractor and trailer combination while making use of the peak longitudinal and lateral force from the tires 1. Another novel part is for traction improving range.

In particular, when the vehicle comprises a tractor and a trailer, different combinations of application of the method on either the tractor, or on the trailer, or on both, may be implemented.

As an example, the method may be applied on the trailer, wherein a trailer wheel slip WS is controlled in the step of controlling 103 by a braking control unit BCU of the trailer; or, the method may be applied on the tractor, wherein a tractor wheel slip WS is controlled in the step of controlling 103 by a tractor braking control unit BCU.

More particularly, the method may be applied on the tractor and on the trailer, wherein the tractor wheel slip WS and the trailer wheel slip WS are controlled in the step of controlling 103 respectively by the tractor braking control unit BCU and by the trailer braking control unit BCU.

Still more particularly, the method may applied on the tractor, wherein the tractor wheel slip WS is controlled in the step of controlling 103 by a tractor traction control unit TCU; or the method may be applied on the tractor and on the trailer, wherein the tractor wheel slip WS and the trailer wheel slip WS are controlled in the step of controlling 103 respectively by the tractor traction control unit TCU and by the trailer braking control unit BCU;

In another example, the method may be applied on the tractor, wherein a tractor wheel slip WS is controlled in the step of controlling 103 by the tractor traction control unit TCU and by the tractor braking control unit BCU; or, the method may be applied on the tractor and on the trailer, wherein the tractor wheel slip WS is controlled in the step of controlling 103 by the tractor traction control unit TCU and the tractor braking control unit TCU and the trailer wheel slip WS is controlled in the step of controlling 103 by the trailer braking control unit BCU.

In particular, the desired slip value DSV comprises a desired slip ratio DSR value and a desired slip angle DSA value, and the slip measure or estimation SME comprises a slip ratio SR measure and slip angle SA measure.

Based on the controlled wheel slip WS the traction system TS generates an appropriate drive torque DT on the wheel or the braking system generates an appropriate braking torque BT.

In conventional and electric vehicles, wheel speed is controlled, more accurately in electric vehicles than in conventional vehicles, since motor speed is quite linearly related to voltage and current in an electric motor. Furthermore, in electric vehicles, a motor speed sensor can be used, and a wheel end motor may be controlled.

Figure 2:
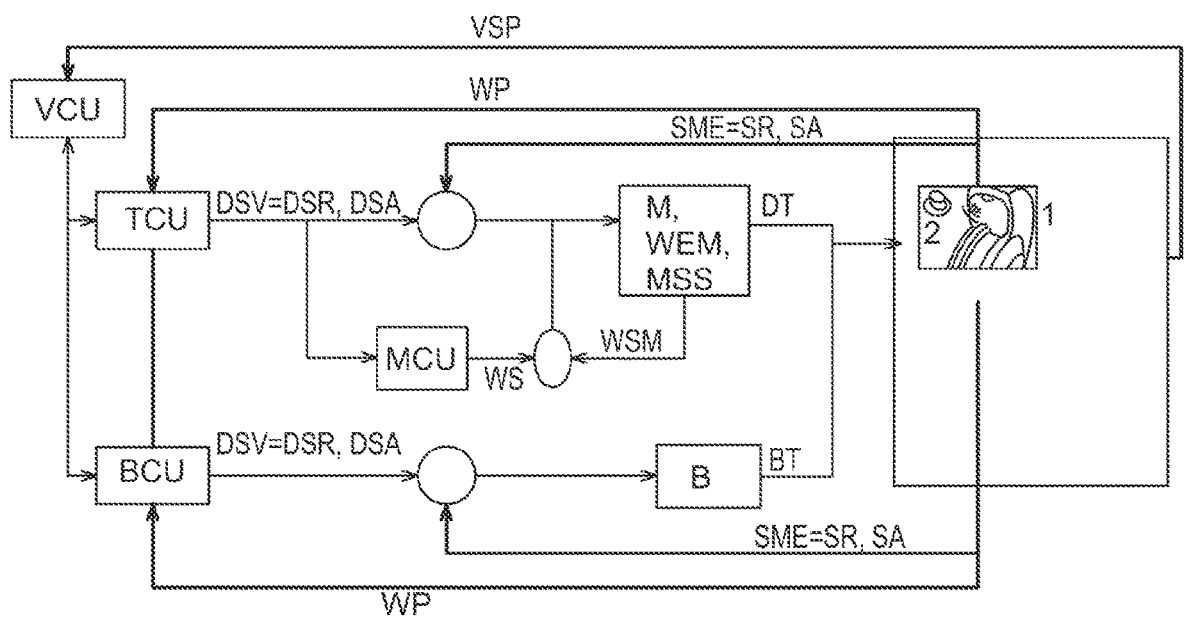
FIG. 2 is a schematic representation of a wheel slip controlling loop according to an embodiment of the invention for electrical vehicles.
Figure 3:
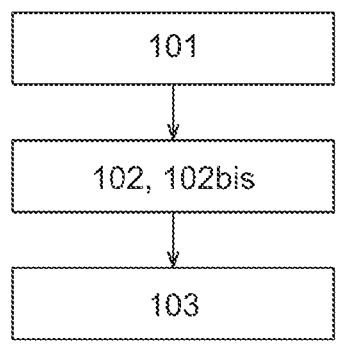
FIG. 3 is a schematic representation of the steps of the method according to an embodiment of the invention.

Therefore, the brake control and/or traction method 100, according to a particular embodiment of the invention for electric vehicles illustrated in FIG. 2, may further comprise a step of collecting 102bis a wheel speed measure or estimation WSM is provided by a motor speed sensor MSS, which is part of a motor M of the electric vehicle. A motor control unit MCU is configured to control the motor M and a wheel end motor WEM, and to control the wheel speed based on the wheel speed measure or estimation WSM. In the step of controlling 103 the wheel slip WS, the wheel slip WS is controlled by the braking control unit BCU and/or by the traction control unit TCU, based on the wheel end motor WEM, and on the desired slip value DSV and on the slip measure or estimation SME and on the wheel speed measure or estimation WSM. Therefore, in conjunction with intelligent tires and regen braking, the regen braking strategy can be optimized at high speeds to ensure we use the maximum braking force from the tires.

The invention claimed is:

1. Method for controlling braking and/or traction of a vehicle, the vehicle comprising a trailer comprising trailer wheels, at least one trailer wheel tire being provided with a sensor configured to collect trailer wheel parameters on the at least one trailer wheel tire, to measure or to estimate a trailer wheel slip measure or estimation from the wheel parameters directly collected on the at least wheel tire, and a tractor comprising tractor wheels, at least one tractor wheel tire being provided with another sensor configured to collect tractor wheel parameters on the at least one tractor wheel tire, to measure or to estimate a tractor wheel slip measure or estimation from the wheel parameters directly collected on the at least wheel tire, the vehicle further comprising a vehicle control unit and a braking control unit comprising a trailer braking control unit and a tractor braking control unit and a traction control unit, the method comprising the following:
 determining by the vehicle control unit a desired slip value based on vehicle state parameters (VSP) including trailer vehicle state parameters and tractor vehicle state parameters, the desired slip value comprising a trailer desired slip value and a tractor desired slip value and being communicated to the braking control unit and to the traction control unit;
 measuring or estimating a slip measure or estimation from wheel parameters collected on the at least wheel tire by the sensor, the slip measure or estimation (SME) comprising the trailer wheel slip measure or estimation and the tractor wheel slip measure or estimation and being communicated to the braking control unit and/or to the traction control unit;
 controlling a wheel slip comprising a trailer wheel slip and a tractor wheel slip, the trailer wheel slip being controlled by the trailer braking control unit, based on the trailer desired slip value and the trailer slip measure or estimation, and the tractor wheel slip being controlled by the tractor braking control unit and by the traction control unit, based on the tractor desired slip value and the tractor slip measure or estimation.

2. Method according to claim 1, wherein the vehicle is an electric vehicle, the electric vehicle further comprising a motor control unit, configured to measure or to estimate a wheel speed measure or estimation, the method further comprising the following:
 measuring or estimating a wheel speed measure or estimation by the motor control unit, based on a motor speed sensor;
 and wherein the wheel slip is controlled by the braking control unit and/or by the traction control unit, based on a wheel end motor, and on the desired slip value and on the slip measure or estimation and on the wheel speed measure or estimation.

3. Method according to claim 1, wherein the tractor wheel slip is controlled in the step of controlling by a tractor traction control unit.

4. Method according to claim 1, wherein the vehicle comprises a tractor and a trailer, the method being applied on the tractor, wherein a tractor wheel slip is controlled by a tractor traction control unit and by the tractor braking control unit.

5. Method according to claim 1, the method being applied on the tractor and on the trailer, wherein the tractor wheel slip is controlled by a tractor traction control unit and the tractor braking control unit.

* * * * *